(12) United States Patent
Russell et al.

(10) Patent No.: US 6,697,072 B2
(45) Date of Patent: Feb. 24, 2004

(54) METHOD AND SYSTEM FOR CONTROLLING AN AVATAR USING COMPUTER VISION

(75) Inventors: Ryan S. Russell, HIllsboro, OR (US); John B. Zipperer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 09/816,158

(22) Filed: Mar. 26, 2001

(65) Prior Publication Data

US 2002/0135581 A1 Sep. 26, 2002

(51) Int. Cl.[7] .............................................. G06T 15/00
(52) U.S. Cl. ....................................................... 345/474
(58) Field of Search ................................ 345/473, 474, 345/475; 382/103, 115; 348/169

(56) References Cited

U.S. PATENT DOCUMENTS

6,535,215 B1 * 3/2003 DeWitt et al. ............... 345/473
6,545,682 B1 * 4/2003 Ventrella et al. ............ 345/473
6,580,811 B2 * 6/2003 Maurer et al. .............. 382/103

OTHER PUBLICATIONS

Sparacino et al., "Digital Circus: A computer–vision based interactive Virtual Studio," IMAGINA, Monte Carlo, Monaco, Jan. 18–20th, 1999.

* cited by examiner

*Primary Examiner*—Phu K. Nguyen
(74) *Attorney, Agent, or Firm*—Pillsbury Winthrop LLP

(57) ABSTRACT

A method and system for controlling an avatar using computer vision is presented. A video stream representing a background and a foreground is received. A user in the foreground is segmented from the background and classified to produce effector information. An avatar may be controlled based on the effector information.

28 Claims, 5 Drawing Sheets

300

METHOD AND SYSTEM FOR CONTROLLING AN AVATAR USING COMPUTER VISION

BACKGROUND

1. Field

This invention relates to computer animation and computer vision. Specifically, this invention relates to a method and system for controlling an avatar.

2. General Background and Related Art

A two- or three-dimensional (3D) computer-animated character such as an avatar may be controlled in a number of ways. For example, in the computer game industry, a character may be controlled via an input device such as a control pad. In a graphical interface, an avatar may be controlled via a mouse or a combination of a mouse and a keyboard. Although limited training may be sufficient to teach users how to operate such control devices, translating various actions performed on such control devices to corresponding animated acts is often neither intuitive nor natural.

Attempts have been made to achieve animated character control based on human gestures. A human user may make certain gestures that correspond to certain control signals. Such gestures may be detected and interpreted via automatic means. For example, video frames of a human user making different gestures may be captured and analyzed so that relevant gestures can be identified and understood. The interpretation of the detected gestures is then used to control the movement of an animated character such as an avatar.

To detect a user's gestures, it is often necessary to first detect where the user is located and when the user makes gestures. Distinctive marks may be used to effectuate detection of the user. Examples of such marks include special clothing, clothing with colored artifacts, or special devices such as infrared tags. As such, the user must wear or carry marks that are obtainable and distinguishable from the user's surroundings. Automated processing identifies these distinctive marks from the images, notes location and movement of the marks, and infers what gestures occurred. Since these approaches require a user to wear marks, the user may feel inconvenienced or uncomfortable.

Another approach requires users to make gestures at predefined positions. While this approach does not require the user to wear or carry marks, it forces the user to memorize the correspondence between different positions and control effects.

Therefore, what is needed is a method and system to control an avatar in a more natural and direct manner.

DETAILED DESCRIPTION

The following detailed description refers to the accompanying drawings that illustrate exemplary embodiments of the present inventions. Other embodiments are possible and modifications may be made to the embodiments without departing from the spirit and scope of the invention. Therefore, the following detailed description is not meant to limit the invention. Rather, the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the presented embodiments may be stored in any storage device, such as, for example, a computer system (non-volatile) memory, an optical disk, magnetic tape, or magnetic disk. Furthermore, the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

A method and system for controlling an avatar using computer vision, as described herein, involves receiving a video stream representing a background and a foreground. A user in the foreground is segmented from the background and classified to produce effector information. An avatar is controlled based on the effector information.

Figure 1:
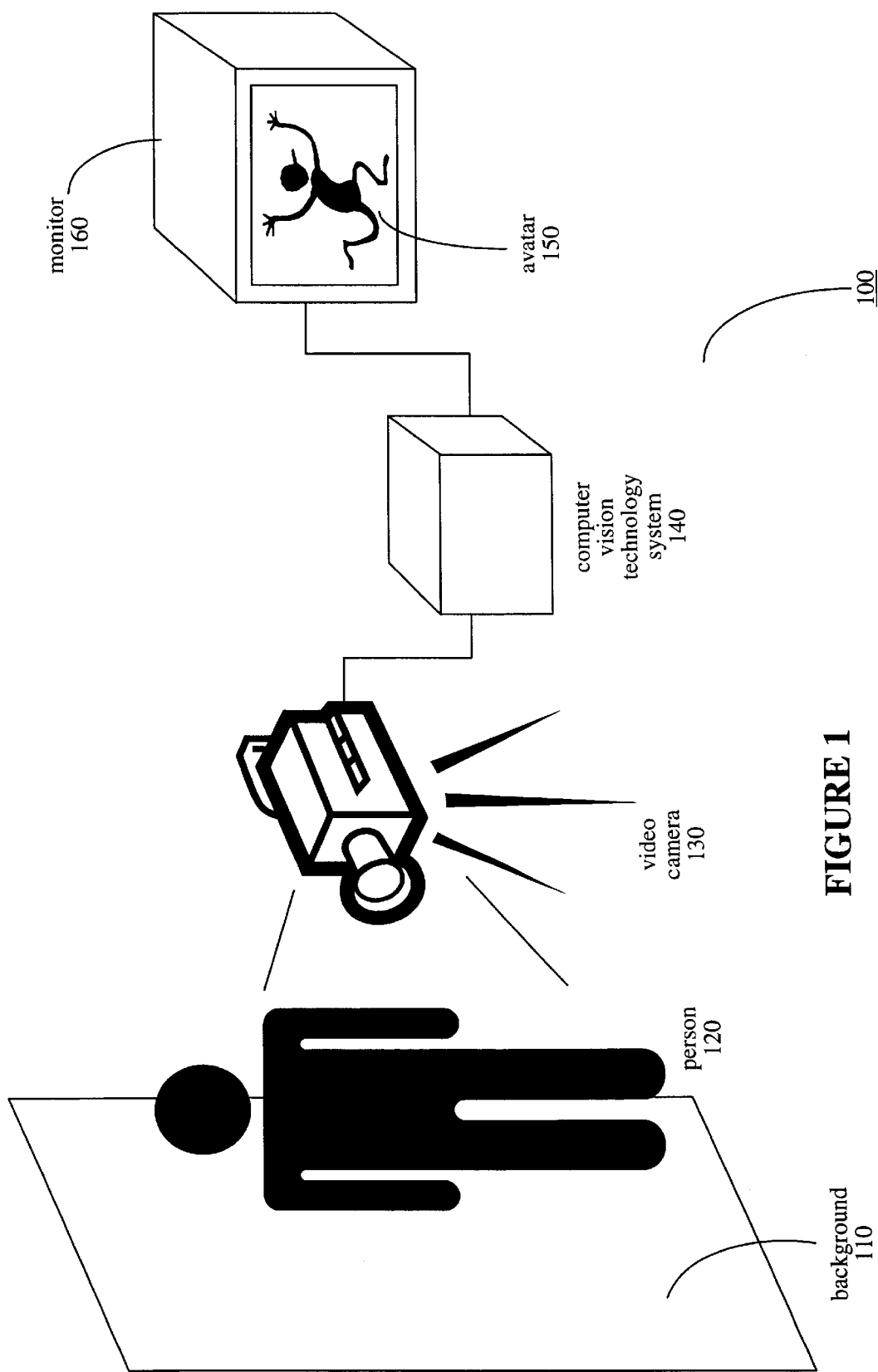
FIG. 1 illustrates an avatar controller system according to the present invention.

FIG. 1 illustrates an avatar controller system according to the present invention. As shown, system 100 comprises video camera 130, computer vision technology system 140, and monitor 160. Person 120 stands in front of background 110. Video camera 130 captures an image of person 120 against background 110, and transmits the image to computer vision technology system 140.

Computer vision technology system 140 processes a video stream received from video camera 130, and produces information necessary to render an avatar 150 on monitor 160. When person 120 moves her hands or head in order to make various gestures, the movements of person 120 control avatar 150 on monitor 160. Accordingly, if latency effects are ignored, avatar 150 may move in lock-step fashion with person 120. For instance, if person 120 raises her hand to wave at video camera 130, avatar 150 may raise its hand as well. In other embodiments, avatar 150 may be partially controlled by an input device (not shown), such as a mouse, keyboard, or a combination thereof.

System 100 may classify users to enable various kinds of users to control avatar 150. Thus, person 120 in system 100 may be replaced by another user, such as, for example, a robot or a bear. In system 100, avatar 150 may represent any kind of artificially created character. For instance, avatar 150 may be rendered as a skeletal figure comprising bones and joints, or as a fully-clothed human or a cartoon character. The present invention may have applicability in many applications, such as gaming software, simulation software, toys, and software for persons undergoing physical therapy.

Figure 2:
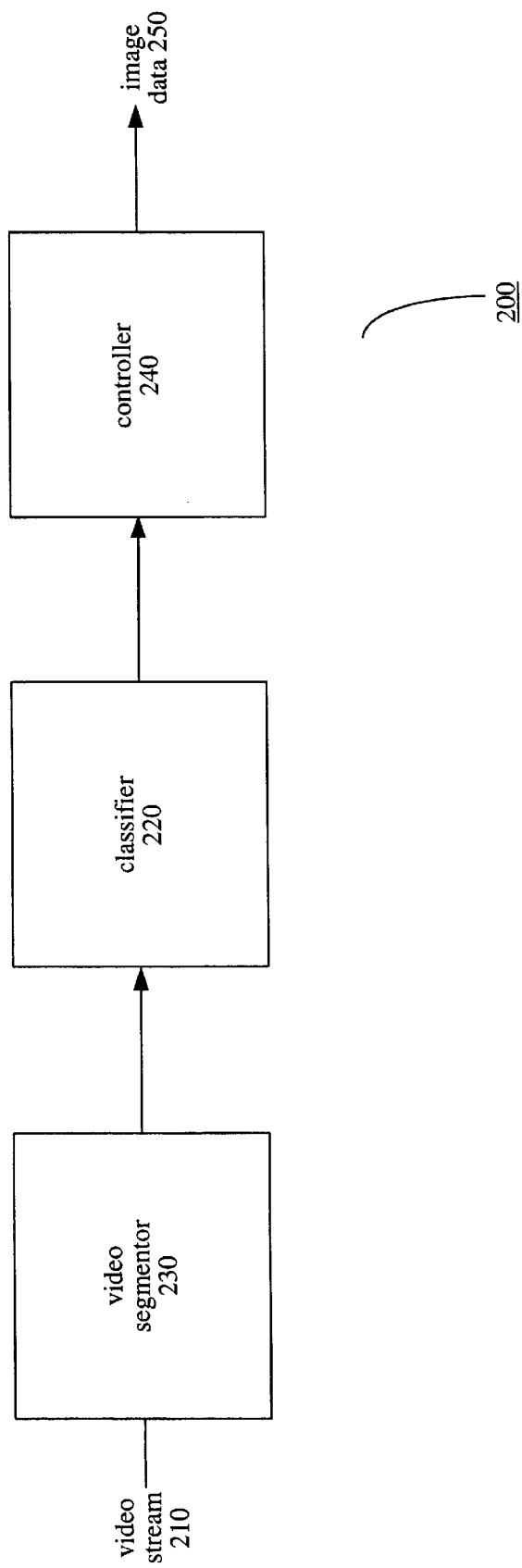
FIG. 2 is a system-level block diagram according to an embodiment of the present invention.

FIG. 2 is a system-level block diagram of system 200 according to the present invention. System 200 comprises video segmentor 230, classifier 220, and controller 240. Video segmentor 230 receives a video stream 210 that may represent a background, such as background 110 in FIG. 1, and a foreground. Video segmentor 230 segments a user in the foreground, such as person 120, from the background. Classifier 220 classifies the user. Accordingly, effector information is produced. The effector information may be inputted into controller 240. The effector information may be expressed in any number of coordinates, such as in two- or three-dimensional coordinates. Controller 240 controls an avatar based on the effector information. As such, controller 240 outputs image data 250 for use by, for example, a display (not shown).

Figure 3:
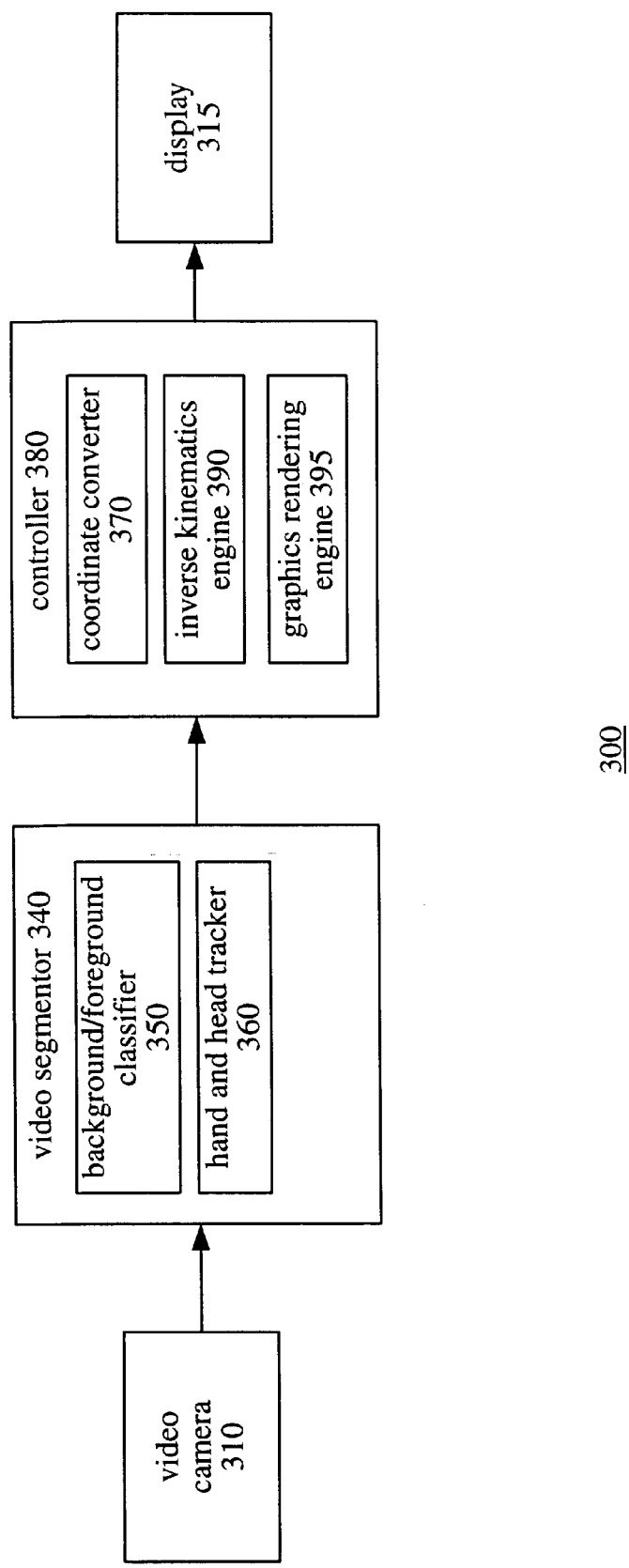
FIG. 3 is a system-level block diagram according to an embodiment of the present invention.

FIG. 3 is a system-level block diagram according to another embodiment of the present invention. System 300 comprises video camera 310, video segmentor 340, controller 380, and display 315. It is to be noted that various components of system 300 may be implemented as separate interconnected modules or as one or more multifunctional devices.

Video camera 310 may be a computer capture camera, such as a CCD or CMOS camera. In an exemplary embodiment, video camera 310 may be aimed at a background. Video camera 310 may be calibrated with respect to the background such that a background reference image is produced. Specifically, video camera 310 may memorize the background so that video camera 310 may extract a user's image from the background. Video camera 310 may capture a video stream which may include a user in front of the background. The video stream need not be stored by video camera 310. Calibration may be performed without a need for a person to place his or her hands in a special position relative to video camera 310; calibration may occur when a person is not standing in front of the background.

Video segmentor 340 may comprise background/foreground classifier 350 and hand and head tracker 360. Video segmentor 340 receives a data stream which includes a background and a foreground. Video segmentor 340 may segment a user in the foreground, including the hands and head of the user, from the background, and classify the user to produce effector information. Video segmentation methods are well known in the art and may be incorporated into the present invention. For instance, television broadcasts of weather forecasters, the Intel Play Me2Cam Virtual Game System by Intel Corporation, and Logitech's GameCam employ such methods.

Specifically, background/foreground classifier 350 may separate the user from the background in the video stream and classify the user. Background/foreground classifier 350 may separate the user from the background in various ways, such as by subtracting the background reference image from each frame of the video stream. Background/foreground classifier 350 may also analyze successive video frames to determine which objects, or portions thereof, are moving and which are stationary. In still other implementations, the background may comprise a blue screen, and a user may be distinguished by filtering such a fixed background from each video frame.

Hand and head tracker 360 may track the hands and head of the user to produce two-dimensional image coordinates of the hands and head. Hand and head tracker 360 may employ an alpha channel and intelligent guessing algorithms. An alpha channel may include foreground and background information of a segmented image. Points may be plotted at various locations in a segmented image, such as at points within the foreground that lie along axes intersecting various edges of the foreground. If sufficient plots are made, hand and head tracker 360 may determine the likely locations of the hands and head of the user. Accordingly, finding of the hands and head of the user may occur irrespective of color. Further, a person or other user in front of video camera 310 need not wear special clothing, carry special tracking objects, or make movements in a predetermined position.

Controller 380 receives effector information outputted by video segmentor 340. Controller 380 may comprise coordinate converter 370, inverse kinematics engine 390, and graphics rendering engine 395. Coordinate converter 370 may convert the two-dimensional image coordinates of the hands and head to three-dimensional image coordinates. Such conversion may not be necessary if a two-dimensional avatar is to be rendered. Various coordinate conversion techniques may be employed by coordinate converter 370, such as those using a constant coordinate value. A coordinate value of varying depth may also be employed, wherein distance between the user and video camera 310 is estimated, and coordinate values are assigned accordingly.

Inverse kinematics engine 390 may receive effector information in the form of 2D or 3D coordinates. To control an avatar, inverse kinematics engine 390 may map such coordinates to produce a corresponding movement of the avatar. Inverse kinematics may be performed for each of the effected joints and bones of an avatar. Intel Corporation produces the Intel 3D Toolkit, which includes an inverse kinematics engine that may be especially appropriate for implementation in the present invention.

In an exemplary implementation, movement of a 3D avatar may be effected by corresponding movements of users. For example, head, left arm, and right arm movement of a user may act as effector information. To cause a 3D avatar to mimic a user facing the 3D avatar, the 3D coordinates of the left hand of the user may control right arm movement of the avatar. Similarly, 3D coordinates of the right hand of the user may control left arm movement of the 3D avatar.

In system 300 in FIG. 3, rendering engine 395 in controller 380 may render the avatar on display 315 based on information provided by inverse kinematics engine 390. Rendering engine 395 may be programmed using the OpenGL or Direct3D application programmatic interfaces (APIs), and may comprise graphics hardware. Display 315 may be chosen based on graphics hardware in 3D rendering engine 395.

Figure 4:
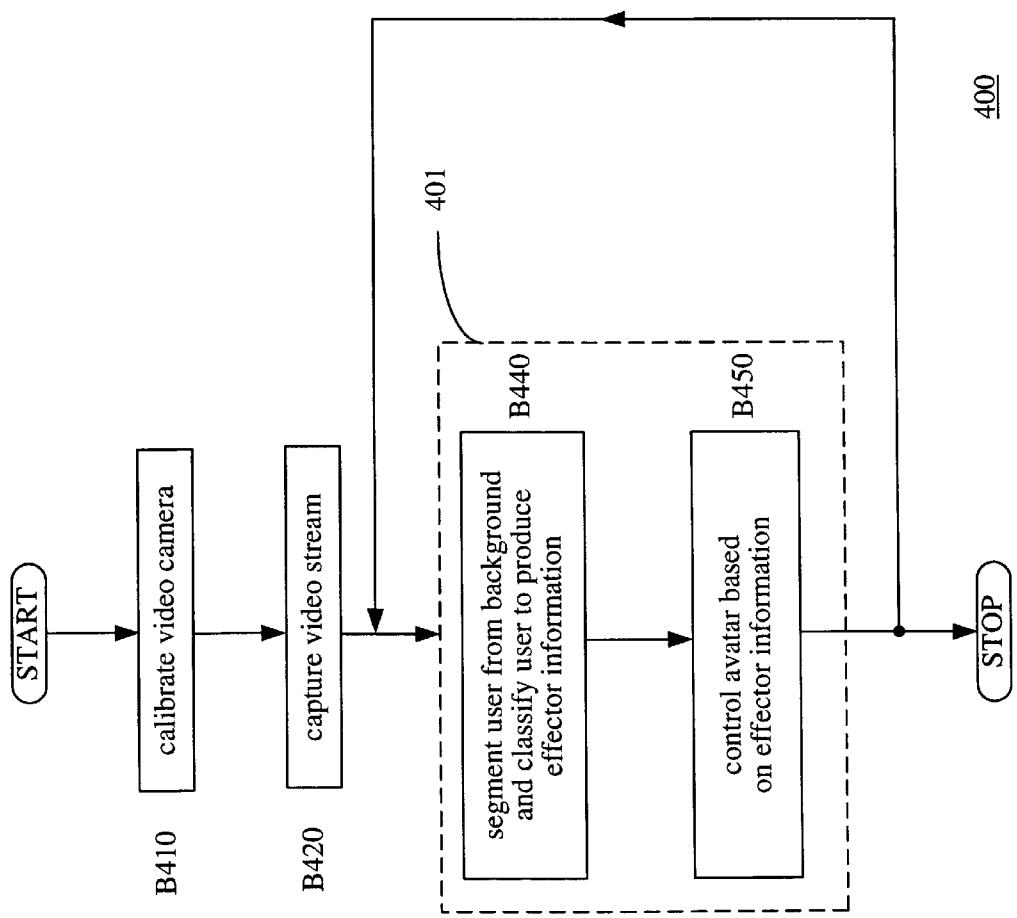
FIG. 4 is a flow diagram of a method according to an embodiment of the present invention.

FIG. 4 is a flow diagram of method 400 according to an embodiment of the present invention. In block B410, a video camera is calibrated with respect to a background. In block B420, a video stream that includes a user in a foreground is captured. Then, in block B440, the user is segmented from the background and classified so as to produce effector information. An avatar is controlled based on the effector information, as shown in block B450.

Figure 5:
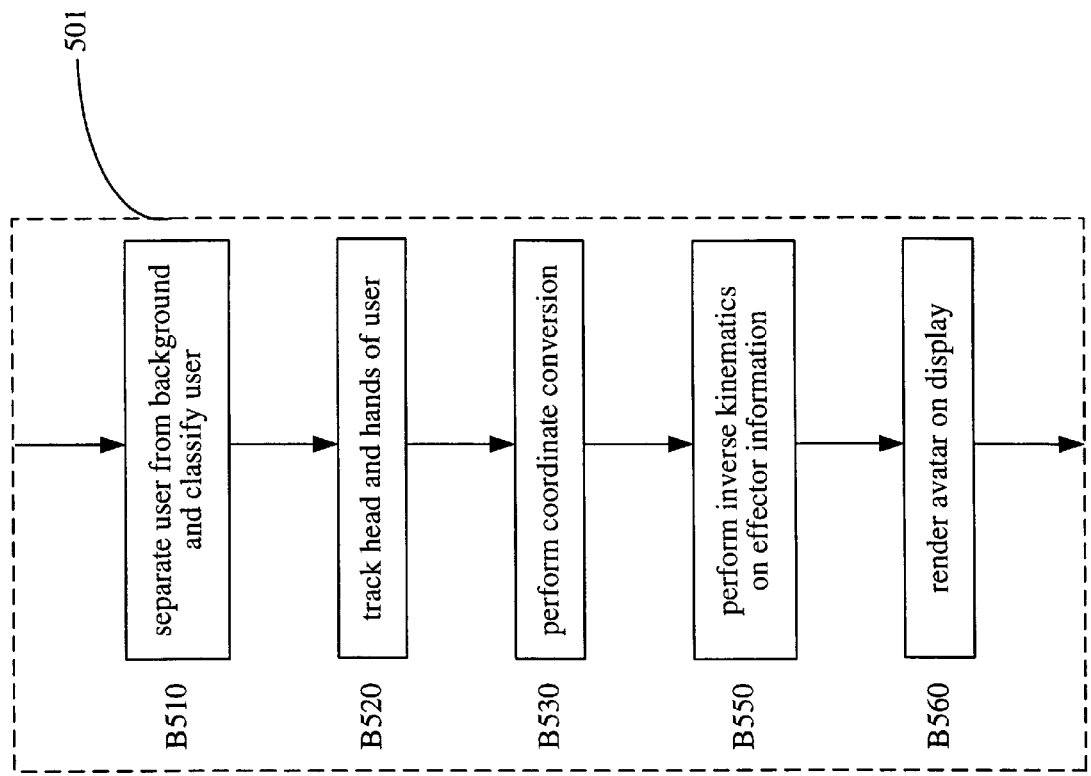
FIG. 5 is a flow diagram of a method according to an embodiment of the present invention.

FIG. 5 illustrates blocks B440 and B450 of FIG. 4 in greater detail. Dashed box 501 of FIG. 5 corresponds to dashed box 401 of FIG. 4. In block B510, after the video stream is captured, a user is separated from the background and classified. In block B520, the head and hands of the user are tracked. In block B530, coordinate conversion is performed. In block B550, inverse kinematics are performed on the effector information. The avatar is rendered on a display in block B560.

The foregoing description of the preferred embodiments is provided to enable any person skilled in the art to make or use the present invention. Various modifications to these embodiments are possible, and the generic principles presented herein may be applied to other embodiments as well. For instance, other parts of a user, such as arms, legs, and feet, may function as effectors to control an avatar. As such, hand and head tracker 360 in FIG. 3 may be modified.

Moreover, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

As such, the present invention is not intended to be limited to the embodiments shown above but rather is to be accorded the widest scope consistent with the principles and novel features disclosed in any fashion herein.

What is claimed:

1. A method for controlling an avatar using computer vision, said method comprising:
   receiving a video stream representing a background and a foreground;
   segmenting a user in said foreground from said background;
   tracking a head position of the user to produce effector information;
   performing coordinate conversion on the effector information;
   performing inverse kinematics on the effector inforamtion; and
   controlling said avatar based on said effector information.

2. The method according to claim 1, wherein said foreground includes a moving user.

3. The method according to claim 2, wherein said effector information includes three-dimensional coordinates of the head position of said moving user.

4. The method according to claim 3, wherein said segmenting said user includes segmenting the head of said moving user.

5. The method according to claim 2, wherein said effector information includes three-dimensional coordinates of at least one hand position of said moving user.

6. The method according to claim 5, wherein said segmenting said user includes segmenting at least one hand of said moving user.

7. A method for controlling an avatar using computer vision, said method comprising:
   calibrating a video camera with respect to a background to produce a background reference image;
   receiving a video stream representing said background and a foreground;
   segmenting a user in said foreground from said background and classifying said user to produce effector information; and
   controlling said avatar based on said effector information.

8. The method according to claim 7, wherein said segmenting said user comprises:
   separating, in said video stream, said user from said background; and
   tracking the head and at least one hand of said user to produce two-dimensional dimensional image coordinates of said head and said at least one hand.

9. The method according to claim 8, wherein said separating said user from said background includes subtracting said background reference image from each frame of said video stream.

10. The method according to claim 8, wherein said controlling further comprises:
    receiving said effector information;
    performing inverse kinematics based on said effector information to produce a movement of said avatar; and
    rendering said movement of said avatar on a display screen.

11. The method according to claim 10, further comprising converting said two-dimensional image coordinates to three-dimensional coordinates before said performing inverse kinematics.

12. The method according to claim 11, wherein said converting includes converting said two-dimensional image coordinates to said three-dimensional coordinates using a constant depth coordinate value.

13. The method according to claim 10, wherein said effector information includes at least one of coordinates of the left hand of said user, coordinates of the right hand of said user, and coordinates of the head of said user.

14. The method according to claim 13, wherein said movement of said avatar includes at least one of head movement, left arm movement, and right arm movement.

15. The method according to claim 14, wherein said controlling further comprises:
    controlling said right arm movement of said avatar using said coordinates of the left hand of said user; and
    controlling said left arm movement of said avatar using said coordinates of the right hand of said user.

16. The method according to claim 10, wherein bones of said avatar are effected, and wherein said performing includes performing kinematics for each of the effected bones of said avatar.

17. The method according to claim 10, wherein joints of said avatar are effected, and wherein said performing includes performing kinematics for each of the effected joints of said avatar.

18. A system for controlling an avatar using computer vision, said system comprising:
    a video segmentor configured to receive a video stream representing a background and a foreground and produce effector information, said video segmentor having a background/foreground classifier and a hand and head tracker
    a controller configured to control said avatar based on said effector information, said controller having a coordinate converter, a inverse kinematics engine, and a graphics rendering engine; and
    a display.

19. A system for controlling an avatar using computer vision, said system comprising:
    a video camera calibrated with respect to a background to produce a background reference image, wherein a video stream is captured using said video camera;
    a video segmentor configured to receive the video stream representing the background and a foreground, and to segment a user in said foreground from said background and classify said user to produce effector information; and
    a controller configured to control said avatar based on said effector information.

20. The system according to claim 19, wherein said segmentor separates, in said video stream, said user from said background, and tracks the head and at least one hand of said user to produce two-dimensional image coordinates of said head and said at least one hand.

21. The system according to claim 20, wherein said segmentor subtracts said background reference image from each frame of said video stream.

22. The system according to claim 20, wherein said controller is further configured to receive said effector information, perform inverse kinematics based on said effector information to produce a movement of said avatar, and render said movement of said avatar on a display screen.

23. The system according to claim 22, wherein said controller is further configured to convert said two-dimensional image coordinates to three-dimensional coordinates.

24. The system according to claim 23, wherein said effector information includes at least one of three-dimensional coordinates of the left hand of said user, three-dimensional coordinates of the right hand of said user, and three-dimensional coordinates of the head of said user.

25. A computer-readable medium having encoded thereon a computer-readable program code which when executed causes a computer to:

receive a video stream representing a background and a foreground;

segment a user in said foreground from said background; and track a head position of the user to produce effector information;

perform coordinate conversion on effector information;

perform inverse kinematics on effector inforamtion; and control an avatar based on said effector information.

26. A computer-readable medium having encoded thereon a computer-readable program code which when executed causes a computer to:

calibrate a video camera with respect to a background to produce a background reference image;

capture a video stream with said video camera;

receive the video stream representing said background and a foreground;

segment a user in said foreground from said background;

track a head position of the user to produce effector information;

perform coordinate conversion on effector information;

perform inverse kinematics on effector inforamtion; and control said avatar based on said effector information.

27. The computer-readable medium of claim 26, wherein said segmenting said user comprises:

separating, in said video stream, said user from said background; and tracking the head and at least one hands of said user to produce two-dimensional image coordinates of said head and at least one hands.

28. The computer-readable medium according to claim 27, wherein said separating said user from said background includes subtracting said background reference image from each frame of said video stream.

* * * * *